INVENTORS
Kenneth W. Guebert
Irby C. Jones, Jr.
BY
ATTORNEY

United States Patent Office 3,352,424
Patented Nov. 14, 1967

3,352,424
COATED FILTER AIDS
Kenneth W. Guebert and Irby C. Jones, Jr., Lake Jackson, Tex., assignors to The Dow Chemical Company, Midland, Mich., a corporation of Delaware
Filed Feb. 7, 1964, Ser. No. 343,297
6 Claims. (Cl. 210—502)

This invention relates to filtration of fluids containing impurities and concerns methods and materials employed to achieve clarification and purification of such contaminated fluids. More specifically, the invention concerns the treatment of anionic-type filter aids with suitable cationic organic polyelectrolytes to provide coated filter aid media which are exceptionally efficient in effecting filtration-removal of dispersed or suspended materials present in fluids. The term "filter aid" will be used herein to designate any one or more the wide variety of well-known materials employed in particulate form for filtration purposes. A large majority of such filter aid materials are characterized by an electronegatively charged surface, e.g. diatomaceous earth, charcoal, sand, fuller's earth, asbestos, paper filter pulp, perlite, etc., and these will be referred to as "anionic-type" filter aids. The term "suitable cationic organic polyelectrolyte" will be used herein to designate normally water-soluble organic polymers and copolymers having a multiplicity of positive charge sites in the molecule, e.g. polyalkylenepolyamines, polyalkylenimines, polyvinylbenzyltertiary amines, polyvinylbenzyl quaternary ammonium salts, vinylbenzylsulfonium polymers, etc., and copolymers thereof. These normally water-soluble polymers form a relatively thin water-insoluble coating on the filter aid due to the bonding action resulting from the opposite charges of polymer and filter aid. "Water-soluble" polymers are those which dissolve in water to give visually continuous solutions which are infinitely dilutable with water.

Large quantities of filter aids are currently employed in many types of large scale operations to remove impurities from fluids. The filter aid is generally deposited on a suitable support or septum to form a layer or bed, frequently referred to as the "precoat," through which the contaminated fluid is passed. The removal of impurities is accomplished by physical entrapment of the solid particles within the filter aid bed which contains a large volume percent of diminutive voids. For example, diatomaceous earth (hereafter DE) which is used in large quantities for liquid clarification may contain as much as 85 to 90 volume percent of interconnected voids which furnish channels for passage of liquid through the filter aid bed. These voids are small enough to trap microscopic size particles and numerous enough to permit removal of large quantities of these particles before binding of the filter media necessitates chemical cleaning or filter replacement.

Figure 1:
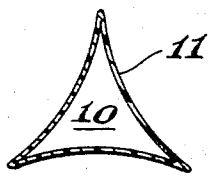

It has now been discovered that anionic-type filter aids can be treated with suitable cationic organic polyelectrolytes to produce a coated filter aid material (as represented by FIGURE 1 wherein 10 is an enlarged cross-sectional representation of a filter aid particle having a coating 11) which possesses filtration characteristics superior to those of the untreated filter aid.

The coated filter aids of the present invention are advantageously characterized by high filtration rates, efficient filtration, i.e. low filtrate turbidity, and long filtration cycles. A periodic addition during filtration of small amounts of the coated filter aid to liquids to be filtered provides a further increase in the liquid filtration cycle length. In comparison with untreated filter aids, the coated filter aids of the present invention permit larger volumes of liquids to be filtered per unit time, longer periods of operation between cleaning and/or replacement of filter aid material and higher percentage removal of particle turbidity from the liquids filtered.

The coated filter aid media of the present invention possess numerous cationic sites which are freely available to attract and hold particles bearing a negative surface charge. This "electrical trap" removal mechanism functions in addition to the less efficient physical entrapment mechanism (of untreated filter aids) which is apparently not impaired by the relatively thin cationic polyelectrolyte surface coating present on the treated filter aid.

The more efficient and effective turbidity removal made possible by the freely available cationic sites of the coated filter aids allows the use of larger size filter aid particles than is permissible when mechanical entrapment alone must be depended upon for turbidity removal in the filtration of liquids. This use of larger size filter aid particles results in larger "filtration channels" which make possible increased filtration rates and longer filtration cycles while maintaining efficient turbidity removal.

In the method of the present invention, anionic-type filter aid particles are coated with small amounts of a suitable cationic organic polyelectrolyte prior to utilization of the particles for filtration purposes. This coating is preferably applied by forming a slurry of filter aid in an aqueous solution of the cationic polyelectrolyte or by tumbling particulate filter aid in a spray of dilute aqueous polyelectrolyte solution. The slurry or spray treatment is normally followed by dewatering and drying of the resulting coated filter aid although the coating treatment may immediately precede use of the coated filter aid in which case the wet, coated particles are merely deposited on the filter support.

A concentration of from about 1 to 15 weight percent of the polyelectrolyte in aqueous solution is preferably employed to slurry or spray-treat the anionic filter aid. From about 0.05 to 0.5 weight percent of the coated filter aid product consists of the polyelectrolyte which forms an adherent surface layer bonded to the filter aid by the attraction of the oppositely charged materials. In the formation of this coating, only a portion of the cationic sites are neutralized by the bonding action leaving numerous freely available cationic sites to attract and hold negatively charged particles present in fluids passing through the filter bed. In order for this "electrical trap" phenomenon to be advantageouely effective, it is necessary to select a cationic organic polyelectrolyte which will furnish freely available cationic sites about the periphery of the coated filter aid particle.

The cationic organic polyelectrolytes suitable for this purpose are generally characterized by being relatively linear polymers with little, if any, cross-linked and preferably have a fairly high ratio of cationic charge sites to molecular weight. As previously stated, these polyelectrolytes must furnish freely available cationic sites, after bonding to the anionic-type filter aid has been accomplished, in order to provide more efficient removal of impurities at higher flow rates of contaminated fluids than is possible with the untreated filter aid.

Cationic organic polyelectrolytes which are especially efficacious for use in the treatment of anionic-type filter aids, to produce the coated filter aid materials of the present invention, are those prepared by the polymerization of alkylenimines, e.g. ethylenimine, to form polyalkylenimines, and by the condensation reaction of dihaloalkanes with polyalkylenepolyamines, e.g. ethylene dichloride and triethylenetetraamine, to form polymeric polyalkylenepolyamines. These polymers possess a comparatively high ratio of cationic charge sites to molecular weight and form water-soluble aqueous solutions of the desired concentration for use in coating the anionic-type filter aids.

The following examples describe completely respresentative specific embodiments and the best mode contemplated by the inventors of carrying out the invention. These examples, however, are not to be interpreted as limiting the invention other than as defined in the claims.

EXAMPLE 1

The efficiency of untreated and polyelectrolyte coated filter aids in removing turbidity was studied in the following manner. A ball clay was used to prepare a contaminated water supply having 444 parts per million (hereafter p.p.m.) turbidity as determined by optical measurements. Aliquots of this turbid water were then passed through 30 gram quantities of either untreated filter aid or coated filter aid contained on a 200 mesh nickel screen support encased in a vertical cylinder. The filter aid (diatomaceous earth) formed a bed of uniform depth over the cross-sectional area, 0.110 sq. ft., of the cylinder. A constant pressure head of 400 mm. Hg was maintained during filtration.

In Table 1, below, the results of several such experiments are tabulated. Column (1) designates the precoat material (DE or DE having an 0.1 weight percent coating of a specified polyelectrolyte) and Column (2) lists the effluent turbidity. In all cases a fixed amount of untreated filter aid was mixed with the influent to facilitate more rapid filtration of a total of 3 gallons of contaminated water through the 30 grams of filter aid media forming the precoat.

Table 1

| (1) | (2) P.p.m. |
|---|---|
| Untreated DE | 81.2 |
| DE coated with polyethylenimine (mol wt. greater than about 100,000) | 2.7 |
| DE coated with polyethylenepolyamine (mol. wt. greater than about 100,000) | 4.7 |
| DE coated with polyvinylbenzyltrimethyl ammonium chloride | 8.2 |

A similarly advantageous increase in turbidity removal is demonstrated when sand, charcoal, coal, paper filter pulp, fuller's earth and asbestos are treated with the listed polymers to yield a coated filter aid containing 0.1 weight percent of the polyelectrolyte.

EXAMPLE 2

The following experiment illustrates the effect of treating DE with cationic and anionic polyelectrolytes to form a product containing 0.1 weight percent polyelectrolyte. Turbidity removal is compared with that of untreated DE as well.

A pressure DE filter system with a filter area of 0.25 ft.$^2$ containing 30 grams of DE was employed to maintain a constant flow rate of 0.5 gallon per minute. The influent contained particles of a ball clay selected by the National Sanitation Foundation as the standard for diatomite testing.

Table 2, below, lists the effluent turbidity values which are taken as the average turbidity from the start of the filter run to the end point as determined by a rise in pressure across the filter cake to 10 p.s.i.g.

Table 2

[Initial turbidity=6 p.p.m.]

| DE: | Effluent, p.p.m. |
|---|---|
| Untreated | 0.40 |
| Cationic-treated (polyethylenimine) | 0.14 |
| Anionic-treated (sodium polystyrene sulfonate) | 0.66 |

The advantageous effect of the cationic-type coating is in clear contrast to the effect of the anionic-treated material in effecting turbidity removal.

EXAMPLE 3

The procedure of Example 1 was followed with the exception that the filtration was terminated when more than 45 minutes was required to filter one liter of turbid influent. When DE was treated with polyethylenimine (hereafter PEI) or polyethylenepolyamine polymer (hereinafter PEPA) to provide a filter aid having an 0.1 weight percent polymer coating, approximately 2.4 times as much liquid filtrate was collected, before the rate slowed to 45 minutes per liter, as when untreated DE was employed.

Those cationic organic polyelectrolytes which furnish the largest numbers of freely available cationic sites when employed as a filter aid coating are preferred for use in the method of the present invention. The relative numbers of such freely available cationic sites on a coated filter aid can readily be determined by the procedure outlined below which establishes an "index" of the number of such sites. Indices determined by this method are correlated to filter cycle length and turbidity removal to establish the effectiveness of cationic polyelectrolytes for use in coating anionic-type filter aids.

PROCEDURE A

A high molecular weight anionic polyelectrolyte (a material corresponding to a copolymer of 30 mol percent sodium acrylate and 70 mol percent acrylamide and having a molecular weight of approximately 2,000,000) was prepared employing carbon 14 to enable the use of tracer techniques in analytical determinations. This polymer was of sufficiently high molecular weight to furnish molecules closely approximating the size of the anionic charge bearing impurities generally present in contaminated liquids subjected to filtration through filter aid beds in clarification and purification procedures. The size of this polymer molecule insured its reaction with only the freely available cationic sites of the polyelectrolyte coated filter aid which are equally available to colloidal and suspended anionic contaminants normally encountered in practical applications of filter aid media. The stock solution of tagged polyacrylamide was prepared to contain 10 parts per million of polymer.

Figure 2:
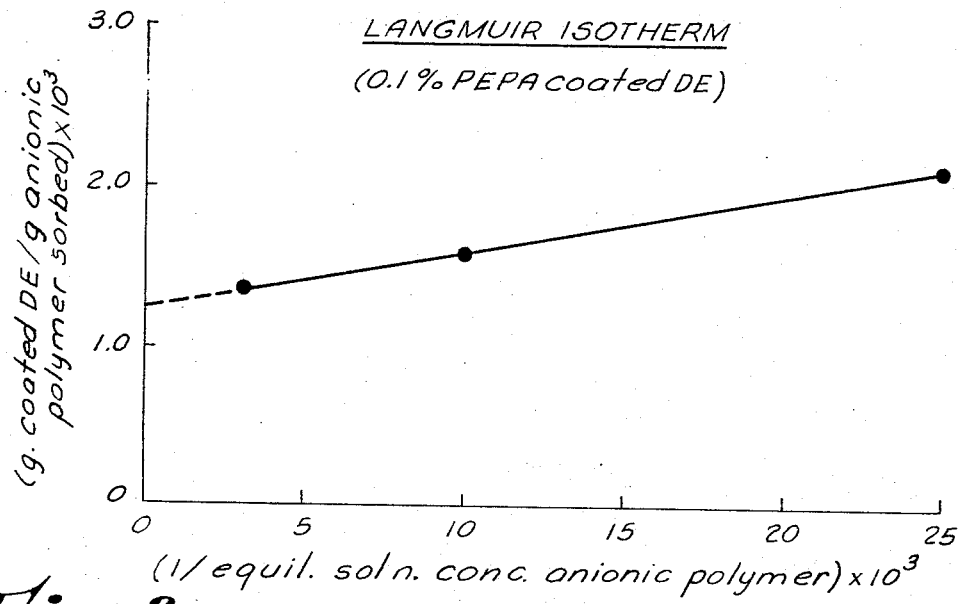

A quantity of 10 ml. of a one weight percent aqueous solution of polyethylenepolyamine polymer (molecular weight about 200,000) was diluted to 500 ml. and employed to slurry 100 grams of DE filter aid (surface area=4 meters$^2$/gram; mean particle size=23.8 microns). This was maintained for 30 minutes by employing a paddle agitator at 100 r.p.m. to keep the DE in suspension. The slurry was then dewatered on a Buchner funnel, re-slurried with deionized water and dewatered as before to remove any excess polymer. This wash and dewatering step was repeated twice and the coated DE, having an 0.1 weight percent polyelectrolyte coating was then dried on trays at ambient laboratory temperatures for 24 hours and bottled. Five aliquots of this dried, coated filter aid (0.25, 0.50, 0.75, 1.0 and 1.5 grams) were separately re-slurried with 50 ml. portions of the previously described stock solution of tagged anionic polyacrylamide for 15 minutes. A multi-paddle stainless steel agitator was employed at 100 r.p.m. in order to allow equilibrium adsorption conditions to be established. A low speed centrifuge was used to separate the coated filter aid and the liquid which was then decanted and analyzed by liquid scintillation counting techniques. Each sample was counted ten times with the average count per minute (c.p.m.) related to the concentration (p.p.m.) of tagged polyacrylamide by a plot of c.p.m. versus known solution concentrations. From these data, the grams of coated filter media (adsorbent) per gram of anionic polymer (adsorbate) sorbed was plotted versus the reciprocal of the equilibrium concentration of the anionic polymer. This plot follows the well-known "Langmuir adsorption theory" and is extrapolated to zero adsorbate concentration. The reciprocal of this zero adsorbate intercept denotes the grams of anionic polymer adsorbed per gram of coated filter media, or grams adsorbate/gram adsorbent. In the present case, the reciprocal of this zero intercept yields the grams of anionic polymer adsorbed per gram of polyethylenepolyamine coated DE, which value provides an index of the number of freely available cationic sites present on the 0.1 weight percent polyethylenepolyamine coated filter media. FIGURE 2 illustrates the foregoing procedure which results in an index equal to 0.820 for the number of freely available cationic sites on the product. This index represents the number of grams of sorbed adsorbate per gram of adsorbent at zero solution concentration of the adsorbate.

This index of the number of freely available cationic sites can be obtained for any material employed as a filter aid coating at a given concentration as well as for various concentrations of each coating material present in the final product. In order to correlate indices obtained in this manner, for various cationic organic polyelectrolytes and other materials employed to coat filter aid media, with filtration characteristics, a "filtrability index" was established in the following manner.

PROCEDURE B

Figure 3:
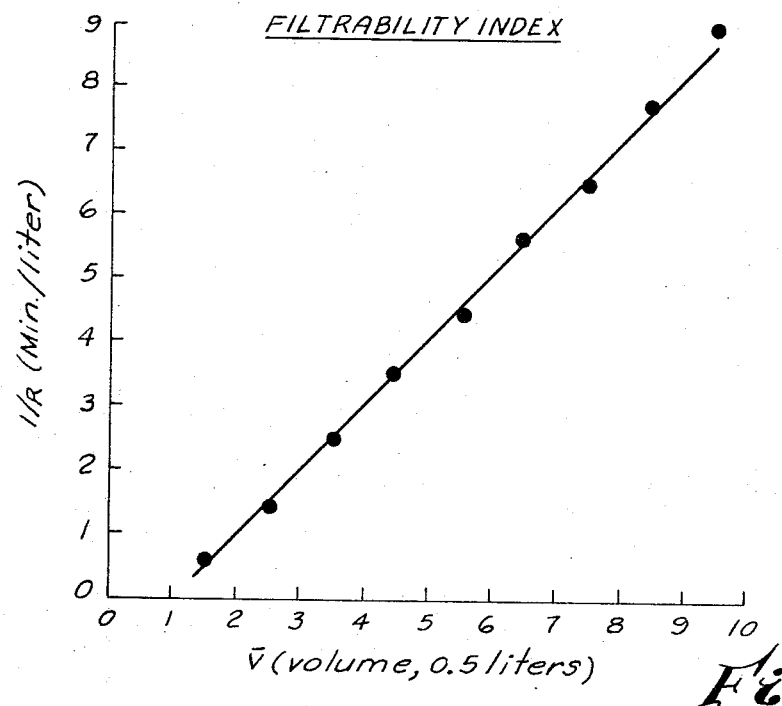

"Filtrability indices," defined as the slopes of lines obtained by plotting the reciprocal of the rate of filtration (ordinate) versus the average volume of filtrate (abscissa) over a stepped time interval, were determined as in the following procedure illustrated by FIGURE 3.

Figure 4:
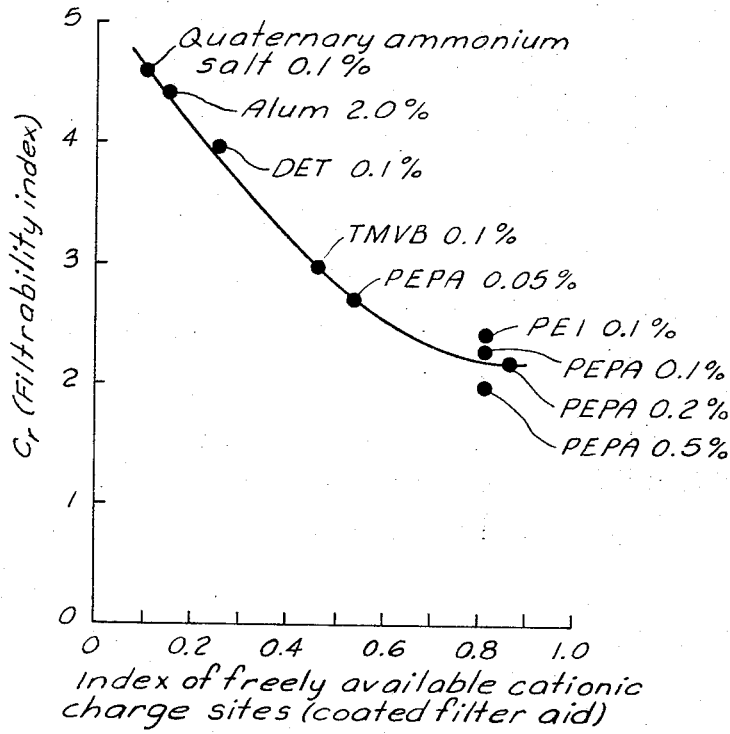
Figure 5:
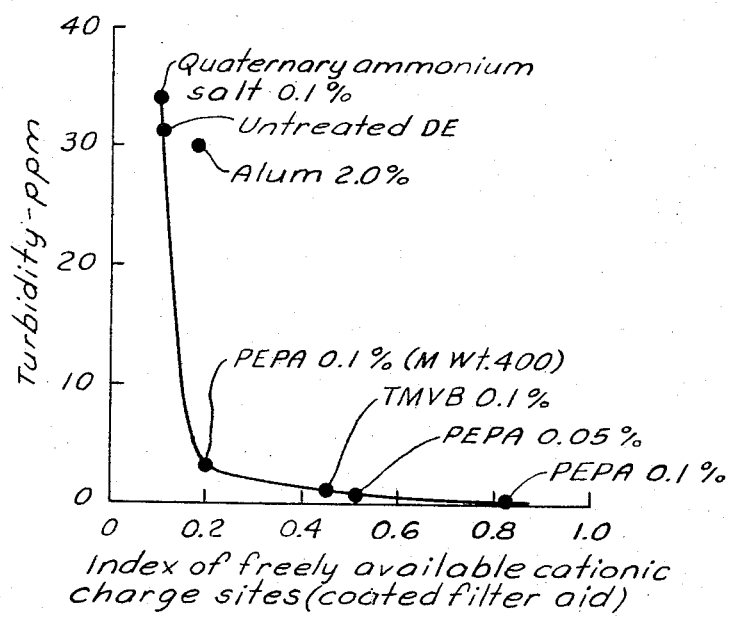

A filter septum was covered with a precoat of thirty grams of DE and employed to filter an aqueous feed having five grams per gallon of suspended ball clay (Kaolinite-silica) impurity and 2.5 grams per gallon of DE having 0.2 weight percent polyethylenepolyamine coating. The filtration was carried out under constant pressure and the "filtrability index" ($C_V$) was obtained from the slope of the line plot of data as in FIGURE 3. Higher values of $C_V$, which indicate more rapid rate deceleration, are noted for filter aids coated with polyelectrolytes having lower indices of the number of freely available cationic sites. This is demonstrated in FIGURE 4 where filtrability index is plotted (ordinate) versus index of the number of freely available cationic sites for a number of polyelectrolytes employed to coat DE. In FIGURE 4 and FIGURE 5 explained below, the polyethylenepolyamine (PEPA) employed to coat DE had a molecular weight of more than 100,000 except where noted. Similarly, the polyethylenimine was of molecular weight greater than 100,000. The quaternary ammonium salt employed was of the alkyl trimethyl ammonium chloride and dialkyl dimethyl ammonium chloride type wherein the alkyl chains contain from 8 to 18 carbon atoms. The points on the figures identified by the letters TMVB represent DE coated with a copolymer of acrylamide and vinylbenzyltrimethyl ammonium chloride.

The index of the number of freely available cationic charge sites is correlated to efficiency of turbidity removal in FIGURE 5 where the filtrate turbidity (initial influent turbidity=444 p.p.m., optical measurement) is plotted in p.p.m. on the ordinate and the cationic charge index is plotted as the abscissa. The kind and amount of coating on the DE filter aid is noted for each point.

The foregoing examples and procedures demonstrate the improvement in filtration characteristics of anionic-type filter aids when a suitable cationic organic polyelectrolyte coating is employed to coat such media. The class of cationic organic polyelectrolytes preferred for such filter aid coating has been defined by establishing a method for determining an index of the number of freely available cationic charge sites present on the coated filter aid.

We claim:
1. An article of manufacture comprising an anionic-type filter aid having an adherent water-insoluble coating of a normally water-soluble organic cationic polyelectrolyte, said coating having a multiplicity of freely available cationic charge sites.
2. The article of claim 1 wherein said coating constitutes from about 0.01 to 0.5 percent by weight of said article.
3. The article of claim 1 wherein said anionic-type filter aid is selected from the group consisting of diatomaceous earth, perlite, charcoal, sand, asbestos, paper filter pulp, and fuller's earth.
4. The article of claim 1 wherein said cationic polyelectrolyte is polyethylenimine having a molecular weight greater than about 1,000.
5. The article of claim 1 wherein said cationic polyelectrolyte is a polyalkylenepolyamine having a molecular weight greater than about 1,000.
6. An article of manufacture comprising an anionic-type filter aid having an adherent water-insoluble coating of a normally water-soluble organic cationic polyelectrolyte selected from the group consisting of polyalkylenimines, polyalkylenepolyamines, polyvinylbenzyltertiary amines, polyvinylbenzyl quaternary ammonium salts, and polyvinylbenzylsulfonium polymers, said coating constituting from about 0.05 to 0.2 percent by weight of said article.

References Cited

UNITED STATES PATENTS

| | | | |
|---|---|---|---|
| 3,235,492 | 2/1966 | Andresen et al. | 210—52 |
| 3,242,073 | 3/1966 | Guebert et al. | 210—501 X |
| 3,247,106 | 4/1966 | Sopoci | 210—52 |

JOSEPH SCOVRONEK, *Acting Primary Examiner.*

MORRIS O. WOLK, *Examiner.*

E. G. WHITBY, *Assistant Examiner.*